United States Patent Office 3,363,375
Patented Jan. 16, 1968

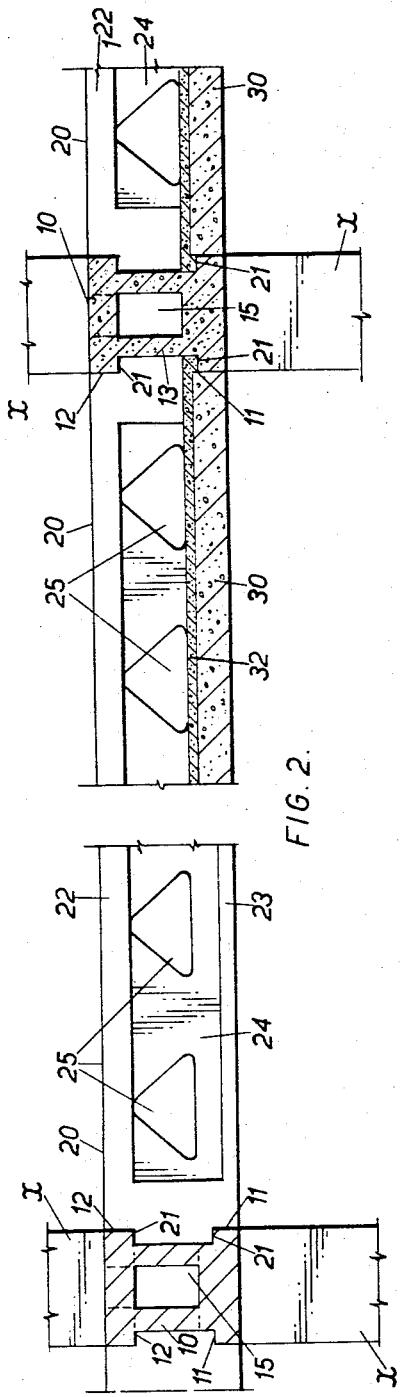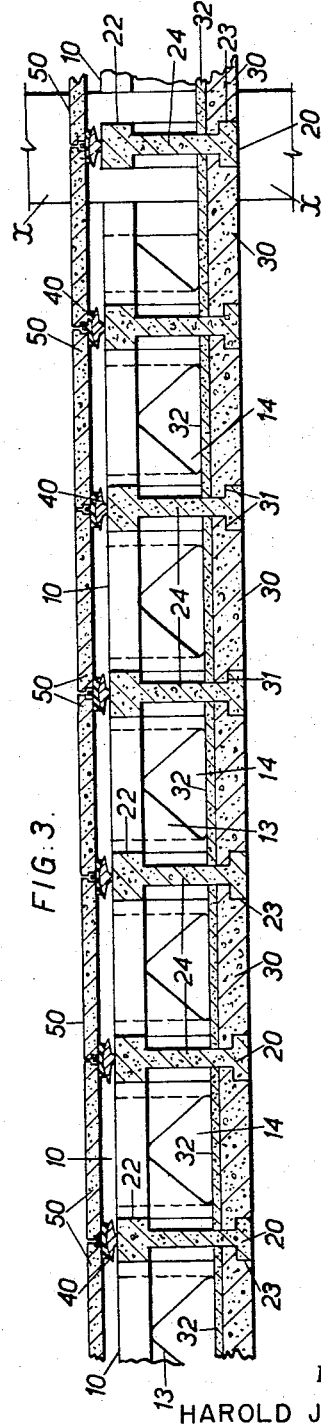
FIG. 2.
FIG. 3.

3,363,375
REINFORCED CONCRETE CAVITY
FLOOR CONSTRUCTION
Harold J. W. Payne, Wirral, England, assignor to H. H. Robertson Company, Pittsburgh, Pa., a corporation of Pennsylvania
Filed Oct. 28, 1965, Ser. No. 505,487
Claims priority, application Great Britain, Oct. 30, 1964, 44,464/64
9 Claims. (Cl. 52—220)

ABSTRACT OF THE DISCLOSURE

A cavity floor structure for housing services including heating and ventilating and electricity for power, lighting, telephones and other communication wiring. The cavity floor structure comprises a basic grid structure of precast concrete beams and joists which support concrete slabs. Precast concrete floor slabs are removably supported on support stools carried by the joists. Access to the floor cavity is available at any unobstructed location in the floor structure by removing one or more of the floor slabs.

---

Figure 1:
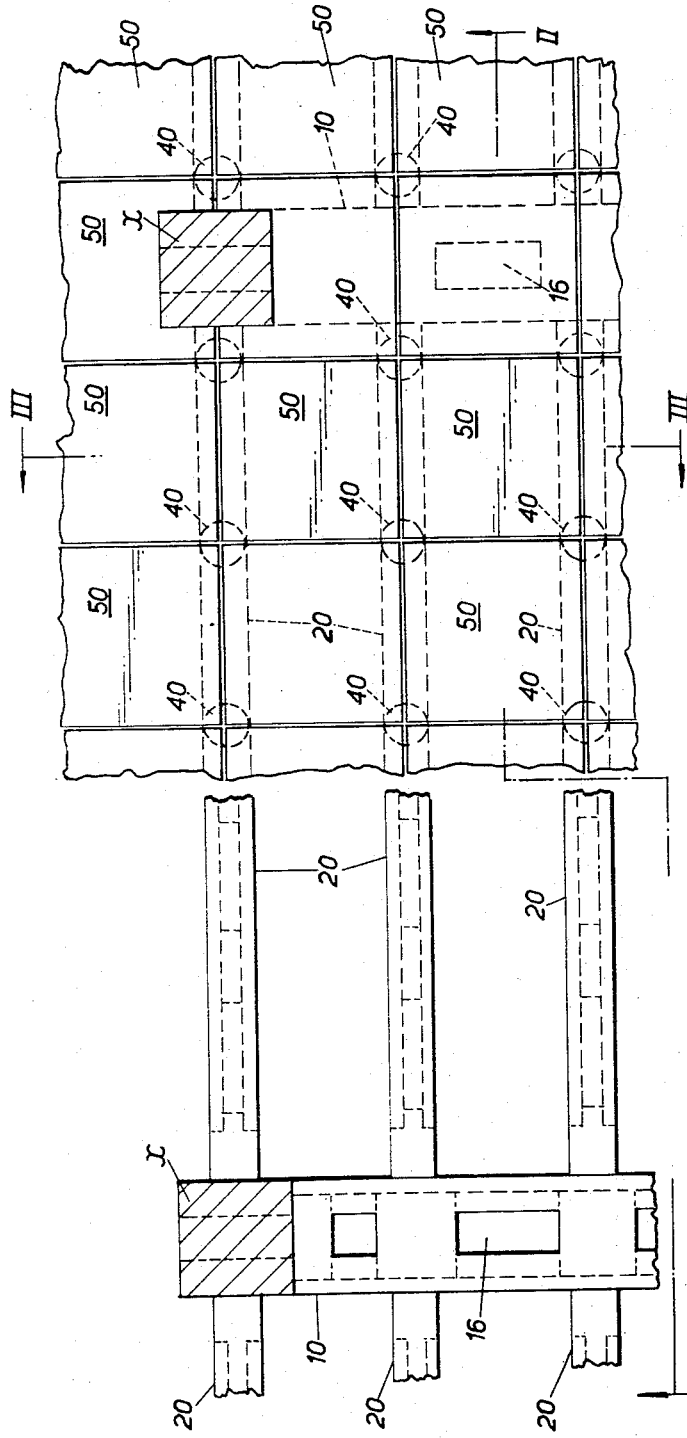

This invention relates to cavity floor structures and more particularly cavity floor structures for hospital and like buildings wherein the housing of a great number of services, as for example heating, ventilation, electricity for power and lighting, telephones, and the like, are of paramount importance.

Heretofore, such a cavity space for the housing of services has been provided by constructing, in a more or less conventional fashion, two load-bearing reinforced concrete floor structures, said structures being spaced apart sufficiently to provide a cavity of required dimensions and access points to said cavity are provided in the uppermost floor structure. Such a structural arrangement entails the expenditure of considerable time, labour, and materials and therefore is of high cost. Further, the provision of access points to the between floor cavity is relatively limited.

The present invention has for its object to provide a cavity floor structure which, whilst providing a cavity space of required capacity insofar as the housing of services is concerned, enables an overall reduction in depth of the floor structure, provides unlimited access to the cavity provided within the structure, and which it is envisaged will enable an appreciable reduction to be made in materials, time and labour, and therefor in the cost of installation.

Broadly, according to the invention, a cavity floor comprises a basic grid structure consisting of a plurality of main I section beams; a plurality of relatively closely spaced subsidiary beams also of I section and which are disposed normal to the run of said main beams and the ends whereof are supported by said main beams; lightweight concrete or hollow tiles or slabs supported upon lower flanges of said subsidiary beams so as to provide an undersurface or soffit for the floor structure; a relatively thin screeding of concrete or the like overlying said lightweight slabs or tiles; a plurality of adjustable corner post or stools supported upon the upper surfaces of said so-formed grid structure, and a plurality of modular floor slabs removably supported on said stools. Such stools are arranged so as to support the floor modules thereby to form a level walking surface, and to permit any one of the floor modules to be lifted to provide access to the floor cavity.

The invention is further described with the aid of the accompanying explanatory drawings which illustrate by way of example only and not of limitation one mode of embodiment.

In said drawings:
FIGURE 1 is a fragmentary plan view of a cavity floor structure according to the invention.
FIGURE 2 is a section taken as on line II—II of FIGURE 1.
FIGURE 3 is a section taken as on line III—III of FIGURE 1.

Referring now to said drawings, the numeral 10 generally denotes main reinforced concrete beams of a floor structure supported by the main building framework $x$ and which beams are substantially of I cross-sectional shape and comprise lower and upper flanges 11, 12 and a web 13. Said beams may be of so-called lattice construction in that they are formed with a plurality of transverse, triangular-shaped apertures 14. Also said beams may be constructed so as to have a through bore 15 having upper access points 16 communicating therewith.

Supported by said beams 10 are a plurality of subsidiary beams 20 disposed parallel one to the other at predetermined spacings and which are supported at each end upon the lower flanges 11 of the co-operating main beams 10. Said subsidiary beams 20 are provided at each end with rebates or cut-outs 21 and are of the same depth as the main beams 10 whereby the upper and lower surfaces of said beams lie (as shown in FIGURES 2 and 3) in the same plane. Said beams 20 also are of I section so as to provide upper and lower flanges 22, 23 and the webs 24 thereof are formed with triangular apertures 25.

To close the gaps between the lower flanges 23 of the beams 20 and to provide a flush undersurface or soffit for the floor structure, there are provided lightweight concrete slabs 30, or hollow tiles, rebated at each side as at 31 and of a thickness such that the undersurfaces thereof are flush with the undersurfaces of the beams 20. Said slabs 30 can be any length commensurate with ease of manufacture and handling. Over said slabs 30 there is provided a screeding 32 of concrete or the like. Said slabs 30 with screeding 32 are adapted to provide a load-supporting surface upon which operators may stand in the installation and maintenance of services.

Supported by or upon the upper flanges of the beams 20 at predetermined spacings are a series of adjustable corner posts or stools 40 arranged, as shown, so as each to support the corners of contiguous rectangular floor slabs 50 of a predetermined module. Said stools 40 conveniently may be of the kind described in U.S. patent application 354,276, filed Mar. 24, 1964 now Patent No. 3,318,057 issued on May 9, 1967, and assigned to the assignee of this application. Such stools are adjustable both as regards height and the angular disposition of their upper supporting head-pieces and which may be electrically insulating. The module floor slabs 50 may be of any suitable construction, for example they may be of wood, metal, plastics, or any combination thereof suited to the traffic and conditions to be withstood.

It will be seen that between the screeding 32 and the floor constituted by the modules 50 there is created a cavity space eminently suited to the housing of heating, ventilating, lighting, and any other required services. The apertured or lattice structure of the grid beams 10 and 20 permit of said services being led to any required point and access to any point in the cavity may be had by simply lifting an appropriately positioned module 50.

The beams 10, 20 of the basic grid structure are of a depth suited to the load to be carried and the cavity required.

What is claimed is:
1. A floor construction comprising:
   a grid structure including
   parallel horizontal reinforced concrete main beams, and parallel horizontal reinforced concrete subsidiary beams having tops and bottoms, said subsidiary beams extending between and being supported by said main beams;

a plurality of rectangular slabs extending between and supported by said subsidiary beams adjacent the bottoms thereof;

a plurality of support stools secured to and projecting above the tops of said subsidiary beams;

a plurality of contiguous floor slabs disposed in a horizontal plane and removably supported on said support stools to serve as a continuous floor surface.

2. The floor construction of claim 1 wherein the said main beams and the said subsidiary beams have the same height.

3. The floor construction of claim 1 wherein said floor slabs are rectangular in plan view.

4. The floor construction of claim 1 wherein the said rectangular slabs are fabricated from light weight concrete.

5. The floor construction of claim 1 wherein
said main beams have an I-cross-section including an upper flange, a lower flange and a vertical web;
said subsidiary beams have an I-cross-section including an upper flange, a lower flange and a vertical web, said upper and lower flanges thereof being cut out at each end thereof to interfit with said main beams.

6. The floor construction of claim 1 including a screeding applied to the upper surface of said rectangular slabs and extending between the webs of said main beams and the webs of said subsidiary beams.

7. The floor construction of claim 5 wherein said main beams have a lattice construction with a plurality of transverse apertures extending through the web thereof.

8. The floor construction of claim 5 wherein the said subsidiary beams have a lattice construction including a plurality of transverse apertures extending through the web thereof.

9. The floor construction of claim 5 wherein
each of said rectangular slabs has an under side rabbet along opposed sides to allow the slab to fit between said subsidiary beams and rest on the lower flanges thereof;
the bottom surfaces of said main beams, said subsidiary beams and said rectangular slabs being essentially coplanar and providing a flush under surface for said floor construction.

References Cited

UNITED STATES PATENTS

| | | | |
|---|---|---|---|
| 2,137,009 | 11/1938 | Stromberg | 52—432 |
| 3,150,748 | 9/1964 | Liskey | 52—403 |

FOREIGN PATENTS

| | | |
|---|---|---|
| 604,294 | 1/1926 | France. |

KENNETH DOWNEY, *Primary Examiner.*